United States Patent [19]

Mandl

[11] 4,096,645
[45] Jun. 27, 1978

[54] PHONETIC TEACHING DEVICE

[76] Inventor: Thomas Herbert Mandl, Oststrasse 20, 4005 Meerbusch I, Germany

[21] Appl. No.: 739,785

[22] Filed: Nov. 8, 1976

[51] Int. Cl.² .................... G09B 19/04; G09B 23/32
[52] U.S. Cl. ....................................... 35/35 R; 35/17; 35/35 C
[58] Field of Search ............... 35/35 R, 35 C, 1, 7 R, 35/8 A, 17; 32/71; 46/171

[56] References Cited

U.S. PATENT DOCUMENTS

| 1,850,899 | 3/1932 | Smith | 35/17 |
| 2,533,010 | 12/1950 | Henabery | 35/1 |
| 2,574,838 | 11/1951 | Olson | 35/17 |
| 3,197,890 | 8/1965 | Lorenz et al. | 35/35 H |
| 3,289,326 | 12/1966 | Bender | 35/350 |
| 3,410,003 | 11/1968 | Sovijarvi et al. | 35/7 R X |
| 3,888,020 | 6/1975 | Krause | 35/17 |

Primary Examiner—William H. Grieb
Attorney, Agent, or Firm—Brezina & Lund

[57] ABSTRACT

Teaching devices are provided which include a transparent element simulating a human head and movable elements simulating articulating organs such as a lower jaw, front and rear portions of a tongue and an uvula, such movable elements being connected to control rods which are manually operable to place the movable elements in positions normally used to produce particular sounds. In addition, elements of elastomeric material having spiral springs cast therein are provided and are operable through tensioned wires for simulating the larynx and lips and positions thereof. A cassette carrying an endless magnetic tape is insertable into a slot in the device and a reproducing head is positioned for cooperation with any selected one of a plurality of tracks on the tape to reproduce a sound corresponding to the positions of the movable elements.

8 Claims, 8 Drawing Figures

PHONETIC TEACHING DEVICE

This invention relates to phonetic teaching devices and more particularly to devices with which the learning of the articulation of sounds is greatly facilitated and which is readily operable and easily adapted for learning of a wide variety of sounds in any language while being comparatively simple in construction and operation and economically manufacturable.

BACKGROUND OF THE PRIOR ART

In connection with the learning of articulation and particularly in the case of foreign languages, instructional practice has in the past included the use of a variety of teaching aids in an attempt to make it possible for the students to learn the proper pronunciation of unusual and difficult sounds in the language to be learned. Such aids have not been entirely successful and have left much to be desired. For example, it was once conventional practice to show the students drawings in textbooks, illustrating the position of the lips when making particular sounds. This type of visual representation is hardly used nowadays due in part to the fact that the acoustic component was missing. Also, the drawings did not portray movements and to portray a large number of positions would require a correspondingly large number of drawings. Of late, it has been conventional practice to use tapes and records carrying the voices of native speakers in order to give the pupil the possibility of absorbing the word or sentence including the proper intonation on the basis of the acoustic perception of the sound to be learned. However, this type of representation is still not entirely satisfactory because most students are not in a position to make the necessary sound merely on the basis of acoustic perception.

In addition, prior methods fail completely, or nearly so, in cases where it is a question of teaching people whose sensory organs are deficient such as, for example, people who are deaf, blind, or both deaf and blind. There are also considerable difficulties in the case of people with speech deficiencies, such as, for example, lisping, hesitation and stuttering. An improvement is usually forthcoming with such people only following a long and extremely costly psychotherapeutic treatment and in some cases no improvement may be possible, because many speech deficiencies are due to a partial sound deafness which is first necessary to cure.

SUMMARY OF THE INVENTION

This invention was evolved with the general object of overcoming the disadvantages of prior methods and devices and of providing a teaching aid which uses quite simple means and which makes it possible to provide an excellent representation of all of the desired acoustic elements of a language and which is therefore well suited to the learning of a foreign language.

Another object of the invention is to provide a device which is usable by persons who were hitherto unable to properly learn a language or only able to do so as a result of a great expenditure due to the fact that their visual and/or acoustic sensory perception was reduced or lacking.

In accordance with this invention, a teaching device is provided in which indicating means are selectively controllable by control means, indicating means being operable to indicate the forms of a plurality of articulations organs used during the oral production of sound and the positions of such organs during the natural oral production of a particular sound, a plurality of different sounds being indicated through control by the control means. In one embodiment, the indicating means are in the form of members which are positioned in accordance with the position of the articulation organs used in the natural pronunciation of sounds. Such members can easily be brought into position or alternatively may be moved automatically into positions corresponding to the performance of the desired sounds, so that the imitation of the requisite sound is made much easier for the pupil who brings his own articulation organs into the same position as that of the indicating members.

The tone or inflection of the particular sound can, for example, be given by the teacher or in accordance with further features of the invention, may be reproduced from a recording medium, preferably an endless magnetic tape in a cassette, the tape having a plurality of parallel tracks corresponding to the sounds to be reproduced and the device having a reproducing head selectively positionable to reproduce any selected one of the sounds. Thus the student can hear the sound, properly articulated at the same time that he observes the indicating means.

It is noted that the indicating means may take a variety of forms and may be observable visually or in other ways, as by touch. In their simplest form, the indicating means take the form of movable members, preferably of plate-like form, connected together and/or mounted on the apparatus. Alternatively, they can be constructed as differently colored picture elements simulating the outlines of the human articulation organs and, for example, may be in the form of light points which light up in a reference grid with the form and position of the organs being then made visible by the individual points lighting up in a corresponding configuration, which can for example be achieved electrically or electronically and by using printed circuits. The indicating means can also be in the form of a structure having movable pins accessible to the sense of touch, making it possible to instruct blind and deaf and blind students. In order to simultaneously make the complete speech process clear to persons handicapped in this way, one hand of the student can scan the reference grid or the pins representing the articulation process while the other hand rests on a vibration surface so that the deaf person is able to control the voiced and voiceless characteristics, which is otherwise impossible. When such a device is used in a language laboratory, each position of the indicating means can be coupled with a printed circuit in such a way that the optionally used optical or tactilely detectable reference grid and the vibration surface are switched on.

Further important features of the invention relate to constructions such that the indicating means are readily operable. Specific features relate to the construction of indicating means for simulating the larynx and also the lips, using elastomeric material with springs embedded therein, preferably operable through tensioned wires.

This invention contemplates other objects, features and advantages which will become more fully apparent from the following detailed description taken in conjunction with the accompanying drawings.

DESCRIPTION OF A PREFERRED EMBODIMENT

Figure 1:
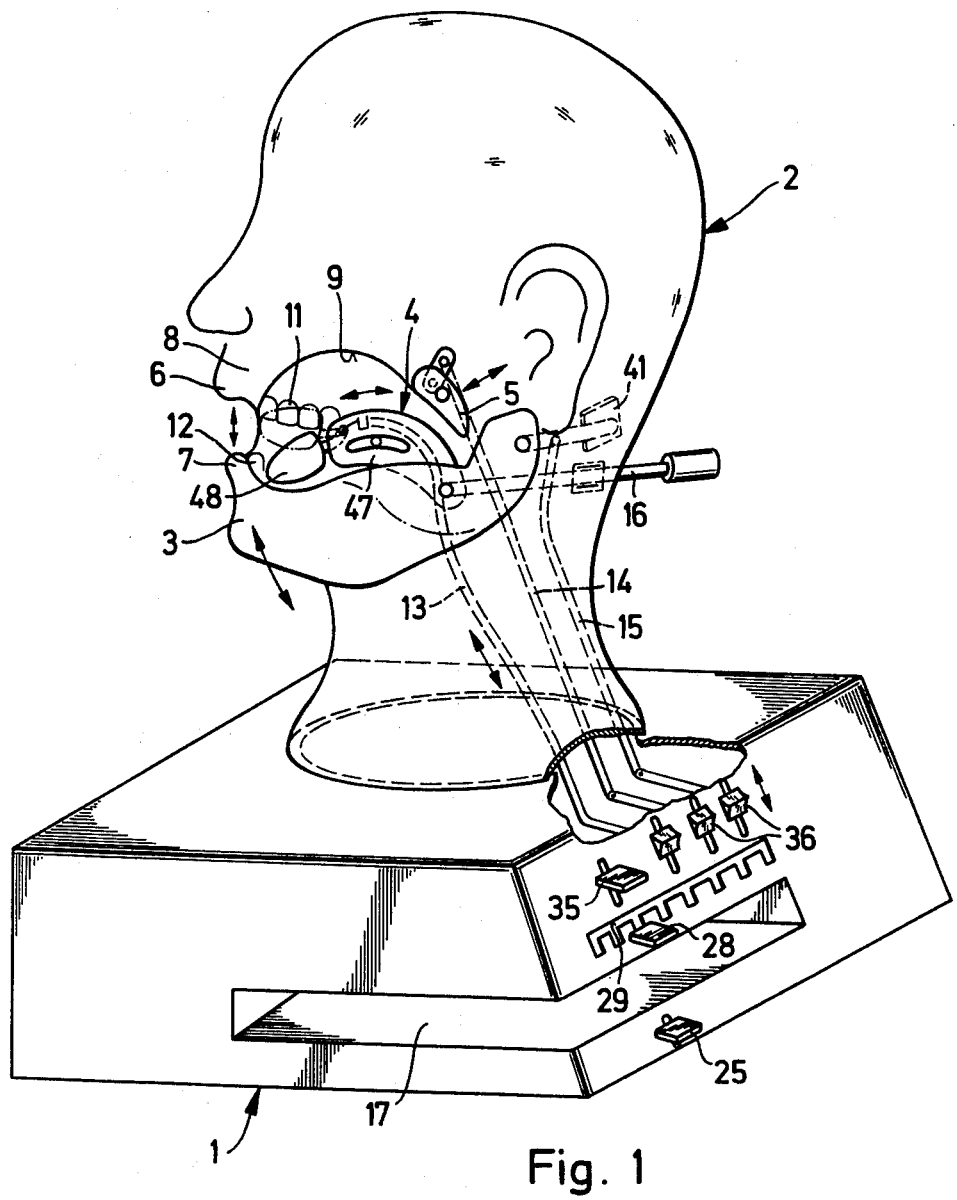
FIG. 1 is a perspective view of apparatus constructed in accordance with the invention, showing certain of the parts used therein.

A preferred embodiment of a device constructed in accordance with the principles of the invention is shown in FIG. 1 and comprises a box-like housing 1 having arranged thereon a phonetic head 2 which simulates a human skull. The head 2, which is preferably made from transparent material, contains indicating means simulating articulation organs, in the form of movably mounted indicating members, such as a lower jaw member 3, a tongue member 4, and uvula member 5, an upper lip member 6 and a lower lip member 7. Stationary portions of the head 2, namely an upper jaw portion 8 and gum portion 9 cooperate with the movable indicating members 2–7. Upper teeth 11 and lower teeth 12 are also indicated. The tongue, uvula and lower jaw members 4, 5 and 3 are operable by operating rods 13, 14, 15 and 16 shown in FIG. 1.

Figure 2:
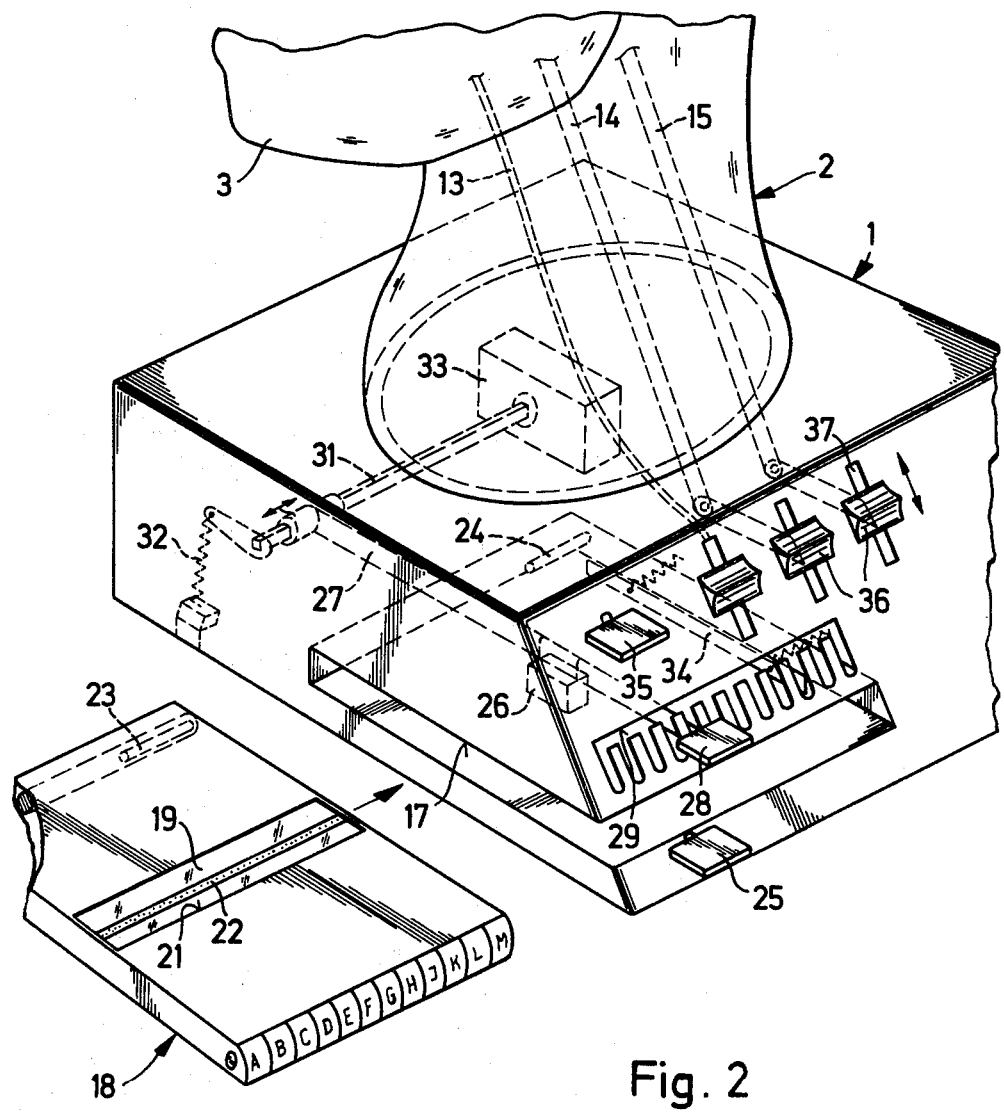
FIG. 2 is a perspective view of a portion of the device of FIG. 1, also illustrating a magnetic tape cassette used with the device and portions of the device for cooperation with the cassette.

Further details of the apparatus are shown in FIG. 2. The housing 1 has on one side a slot 17 for receiving a cassette 18 in which an endless magnetic tape 19 is movable. The tape 19 has a plurality of tracks indicated by reference characters A–H and J–M each of which carries a recording of a particular sound. On the top of the cassette 18 an opening 21 is provided while the tape 19 is provided with a strip 22 of silver or other conductive material, aligned with the opening 21 at a certain position of the tape 19, as illustrated. At one end, the cassette 18 has a drive shaft 23 which is arranged to be coupled to a shaft 24 within the housing 1, shaft 24 being driven by a suitable drive unit, not shown. Shaft 23 is drivingly coupled to shaft 24 when the cassette 18 is inserted in the direction of the arrow as indicated in FIG. 2 and in the fully inserted position, the cassette 18 is held in a play position by a lock-down button 25.

A sound head 26 is located above the recess 21 of the cassette 18 when the cassette is inserted and is carried on an arm 27 which at its front end is provided with a play button 28 adjustable along a comb-like selector shaft guide 29 arranged in the housing 1. At its rearward end, arm 27 is mounted on a bearing shaft 31, arm 27 being movable axially along shaft 31 while being locked against rotation relative thereto, the shaft 31 having a rectangular cross-section and an opening in the end of the arm 27 having a similar cross-section. A restoring spring 32 is coupled to an arm at one end of the bearing shaft 31 and a tripping or stop device 33 is located at the other end of the shaft 31. Restoring spring 32 urges the shaft 31 and thereby the arm 27 in a direction to move the reproducing head 26 and the play button 28 upwardly away from a stop position and also to move the arm 27 out of the slots in the comb-like guide 29. When the play button 28 is moved downwardly to move the arm 27 into one of the slots in the guide 29 and to thereby position the reproducing head 26 in engagement with one of the tracks of the magnetic tape 19, the tripping or stop device 33 operates to releasably lock the shaft 31 in position. Device 33 may be released to allow the play button 28 to move upwardly to its inoperative or "off" position under the influence of restoring spring 32. For example, device 33 may be released in response to an electrical signal developed by engagement of a contact means with the conductive strip 22 after one complete rotation of the tape 19, it being noted that rotation of the drive shaft 24 may be initated, also through the device 33, when the button 28 has moved downwardly.

An ejection mechanism 34 is provided which is operable on release of the lock-down button 25, to move the cassette 18 outwardly from slot 17, to a certain extent, and so as to permit the cassette to be easily removed. Housing 1 also carries a recording button 35 which permits recording of any desired sounds on the tape, using a suitable microphone, not shown.

Manually actuatable buttons 36 are provided for operating the operating rods 13, 14 and 15, the buttons 36 being adjustably movable in slots 37.

Figure 3:
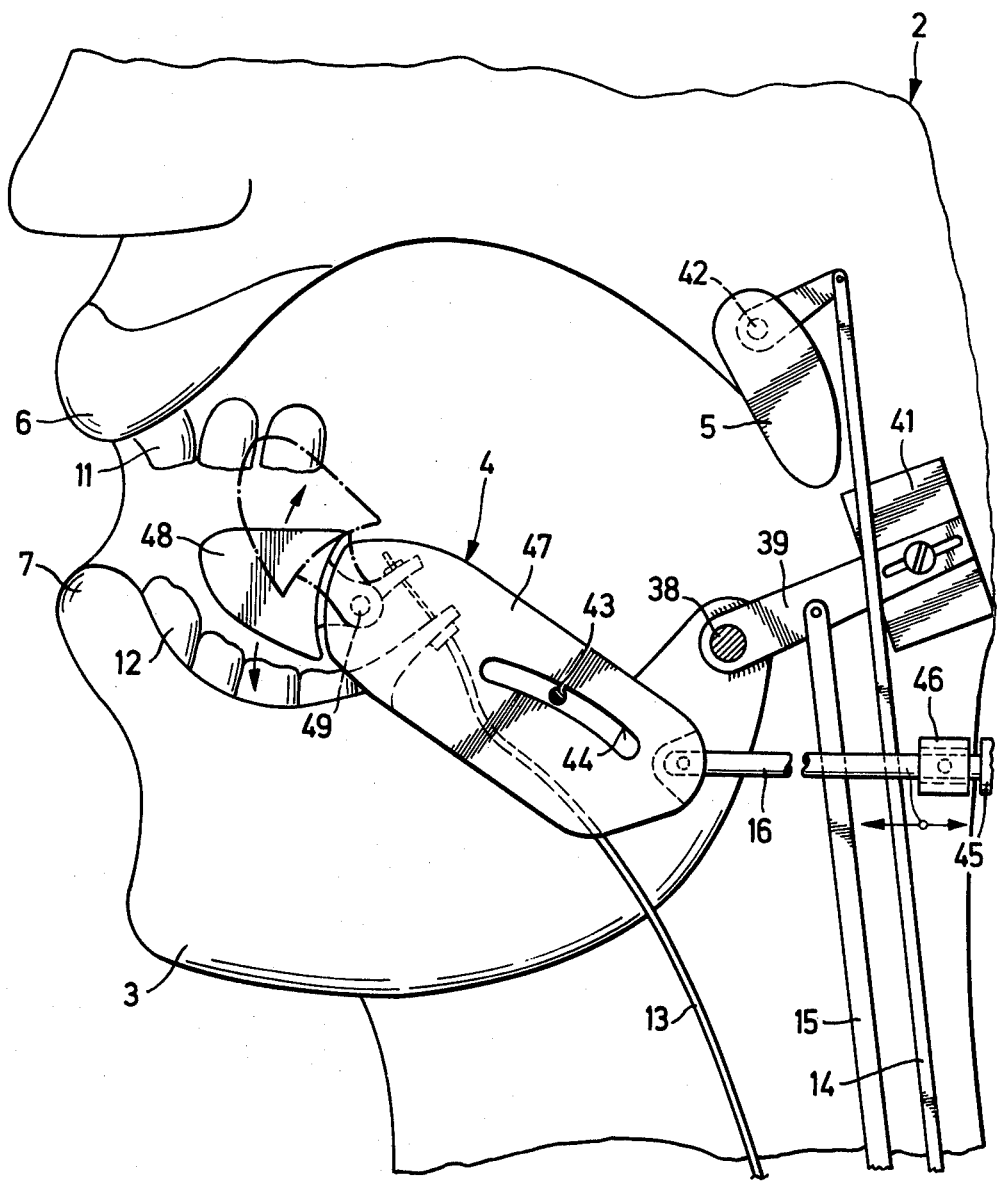
FIG. 3 is a side elevational view, on an enlarged scale, showing part of a head structure of the device.

Details of control of adjustment means for the indicating members 3, 4 and 5, i.e., the tongue, lower jaw and uvula indicating members, are illustrated in FIG. 3. The lower jaw 3 is mounted on a spindle 38 in the head 2 for pivotal movement about a substantially horizontal axis and a lever 39 on spindle 38 is connected to one end of operating rod 15 which is connected to the lever 39. A counterweight 41 is adjustably mounted on the lever 39. The uvula member 5 is similarly mounted on a spindle 42 which carries an arm connected to the operating rod 14. An additional spindle 43 is secured within the head 2 and passes through a longitudinal slot 44 in the tongue member 4. The operating rod 16 is connected to the rear end of the tongue member 4 and is connected to an operating button 45. Operating rod 16 is mounted for axial movement in a bushing 46 located in the head 2 and it serves to move the tongue 4 in a longitudinal direction while also pivoting the tongue 4, the movement of the tongue 4 being controlled by the configuration of the slot 44.

The tongue member 4 is constructed in two parts and comprises a larger rear part 47 and a smaller front part 48. The front part of the tongue member 4 is mounted on a spindle 49 journalled on the front of the rear tongue part 47 and a lever arm on spindle 49 is connected to the operating rod 13 which is in the form of a Bowden cable. It is therefore possible to move the tip of the tongue, i.e., the part 48 in the direction of the arrows shown in FIG. 3, i.e., interalia into the position shown by the dotted lines in which the front part 48 is located behind the upper teeth 11. This is, for example, a position which must be assumed by the tip of the tongue if the English "th" is to be correctly pronounced.

Figure 4:
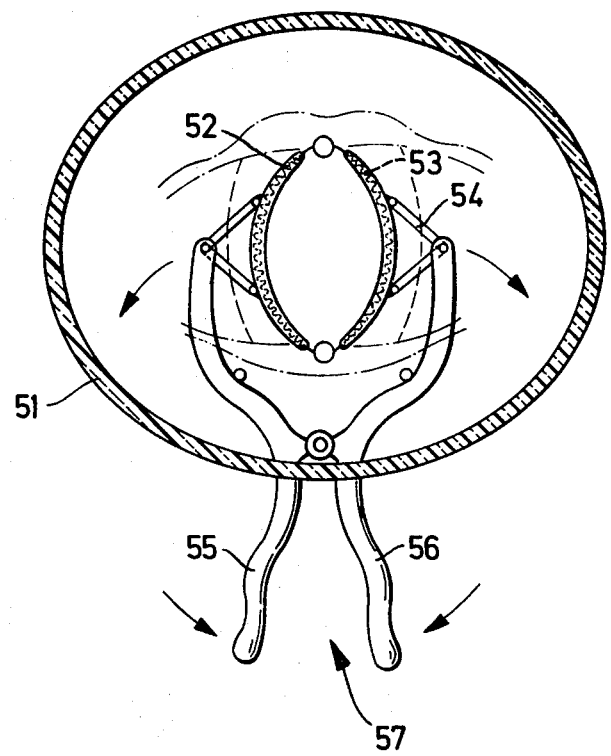
FIG. 4 is a sectional view illustrating a larynx portion of the device.

FIG. 4 is a cross-sectional view through a neck portion, showing parts which illustrate the mechanical process of the movement of the larynx and includes a tubular portion 51 of the head, preferably of transparent material, which represents the neck.

A trachea wall 52 is provided within the neck portion 51, wall 52 being made from an elastomeric material such as rubber and being provided with integrally cast spiral springs 53 which bring about a contraction of the trachea wall 52 under control of control means. In particular, tensioned wires 54 are connected to the outside surfaces of the wall 52, preferably made in two parts as shown, and are connected to the ends of tong members 55 and 56 of a tong-like handle indicated by reference numeral 57. The two parts of the trachea wall can be moved apart by pressing together the tong members 55 and 56 and by means of a corresponding change in the cross-section of the trachea wall 52, it is shown whether a sound must be pronounced in a voiced or voiceless manner.

Figure 5:
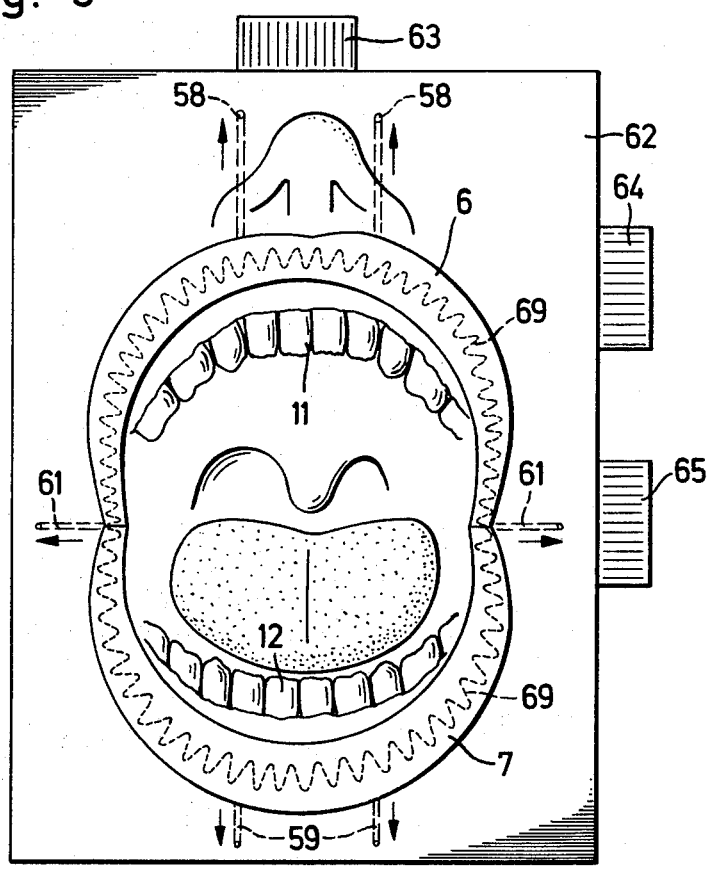
FIG. 5 is a front elevational view of a head portion of the device.
Figure 6:
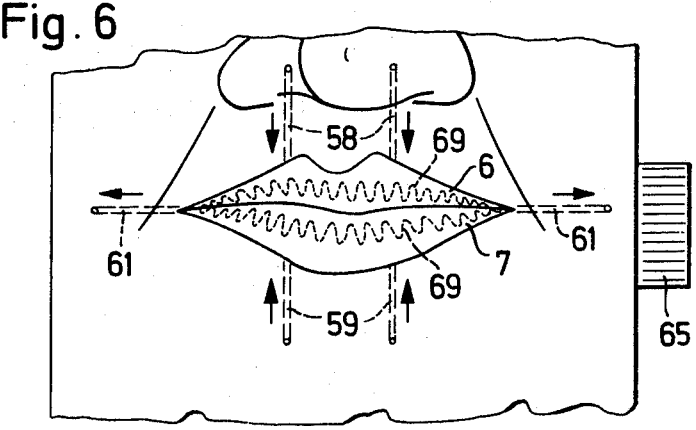
FIG. 6 is a view similar to part of FIG. 5, illustrating lip elements thereof in a closed position.

FIGS. 5 and 6 show the upper lip 6 and the lower lip 7, the lips 6 and 7 being shown in the open position in FIG. 5 and in the closed position in FIG. 6. Lips 6 and 7 can be adjusted in the direction as indicated by the arrows by means of tensioned wires 58 connected to the upper lip 6 and tensioned wires 59 connected to lower lip 7, with tensioned wires 61 being provided for the lateral drawing-apart movement of the lips 6 and 7. The wires 58, 59 and 61 are operable by means of operating buttons mounted in a casing 62.

Figure 7:
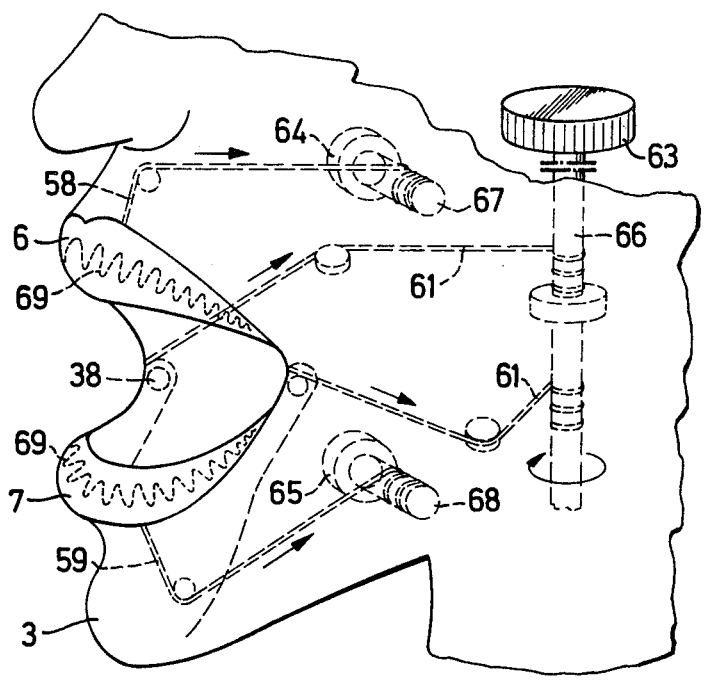
FIG. 7 is a perspective view illustrating adjusting mechanism for the portions of the apparatus shown in FIGS. 5 and 6.

The adjustment is shown more particularly in FIG. 7. The operating button 63 is connected with a take-up reel 66 onto which the wires 61 are wound while wires 58 and 59 extend to reels 67 and 68 connected to rotatable operating buttons 64 and 65. Spiral springs 69 are integrally cast in the upper and lower lip members 6 and 7 which are preferably of an elastomeric material and in the rest position of the wires, the springs 69 bring about a complete drawing together of the lips 6 and 7 as shown in FIG. 6. Thus the lips can be moved apart by rotating the button 63 to tension the wires 61.

Figure 8:
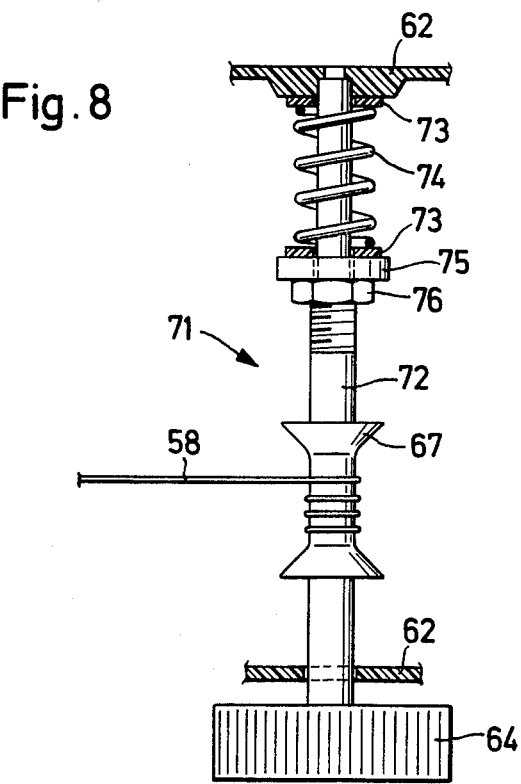
FIG. 8 is a side elevational view, partly in section, illustrating a self-locking device for the adjusting mechanism of FIG. 7.

The reels 66, 67 and 68 are connected with a device 71 which brings about self-locking, one of such devices being shown in FIG. 8. The take-up reel 67 is located on a rod 72 which is mounted on one side in the casing 62. A pair of plastic discs 73 are provided on opposite ends of a coiled compression spring 74 one disc being engaged with the casing and the other being engaged with a portion 75 of an adjustment nut 76 threaded on the shaft 72. Through friction the shaft 72 and thereby the reel 67 is held in a given position of angular adjustment and thus the lips can be accurately brought to and held in specific positions.

The invention is not restricted to the embodiments represented hereinabove, and numerous modifications can be made within the spirit and scope of this invention. Thus, as one example, the representation of the larynx movement can be brought about in that for indicating voiced sounds, the handle is brought into a forwardly pointing straight-ahead position and for indicating voiceless sounds into a position displaced by 90° relative thereto. In the case of an electronically controlled head, a sound sequence can be continuously represented. By using sensors it is even possible to make sentence intonation visible. The apparatus is suitable for instruction in any language.

It will be understood that other modifications and variations may be made without departing from the spirit and scope of the novel concepts of this invention.

I claim as my invention:

1. In a teaching device, indicating means for indicating the forms of a plurality of articulation organs used during the oral production of sound and the positions of said plurality of articulation organs during the natural oral production of a particular sound, and control means for selective operation of said indicating means to indicate the positions of said organs during the natural oral production of a plurality of particular sounds, said indicating means comprising a plurality of indicating members having physical forms corresponding to said plurality of articulation organs, and said control means comprising means for selectively positioning said plurality of indicating members, head structure means associated with said indicating members for indicating the form of internal passage walls which cooperate with said articulation organs in the production of sounds and the relationship of said internal passage walls to said articulation organs represented by said indicating members, said indicating members including rear and front tongue members for representing rear and front parts of a tongue, first pivot means for supporting said rear tongue member for pivotal movement and also for longitudional forward and rearward movements relative to said head structure means, and second pivot means for supporting said front tongue member from said rear tongue member.

2. In a device as defined in claim 1, said control means comprising a plurality of independently operable control rods connected to said indicating members.

3. In a teaching device as defined in claim 2, at least one of said control rods including a Bowden cable.

4. In a teaching device as defined in claim 1, said indicating members further including a lower jaw member and a uvula member for representing the lower jaw and uvula as used together in the production of sound and additional pivot means for supporting said lower jaw and uvula members for pivotal movement about horizontal axes relative to said head structure means.

5. In a teaching device as defined in claim 1, said rear tongue member having a longitudinal slot therein, and said first pivot means including a spindle extending through said slot for providing said relative longitudinal as well as pivotal movement of said rear tongue member.

6. In a teaching device, indicating means for indicating the forms of a plurality of articulation organs used during the oral production of sound and the positions of said plurality of articulation organs during the natural oral production of a particular sound, and control means for selective operation of said indicating means to indicate the positions of said organs during the natural oral production of a plurality of particular sounds, said indicating means comprising a plurality of indicating members having physical forms corresponding to said plurality of articulation organs, and said control means comprising means for selectively positioning said plurality of indicating members, at least one of said indicating members being a deformable member of elastomeric material having springs cast therein, and said control means comprising means controlling deformation of said deformable member.

7. In a teaching device as defined in claim 6, said deformable member representing a trachea wall.

8. In a teaching device as defined in claim 6, said deformable member representing one lip, and an additional deformable member representing a second lip, said control means comprising wires arranged to be selectively controlled in tension to move said deformable members toward and away from each other.

* * * * *